US012163855B2

(12) United States Patent
Xia et al.

(10) Patent No.: US 12,163,855 B2
(45) Date of Patent: Dec. 10, 2024

(54) SYSTEM AND METHOD FOR CABLE IDENTIFICATION

(71) Applicant: Verizon Patent and Licensing Inc., Basking Ridge, NJ (US)

(72) Inventors: Tiejun J Xia, Richardson, TX (US); Glenn A Wellbrock, Wichita, KS (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 297 days.

(21) Appl. No.: 17/900,099

(22) Filed: Aug. 31, 2022

(65) Prior Publication Data

US 2024/0068906 A1 Feb. 29, 2024

(51) Int. Cl.
*G01M 11/00* (2006.01)

(52) U.S. Cl.
CPC .... *G01M 11/3181* (2013.01); *G01M 11/3109* (2013.01)

(58) Field of Classification Search
CPC ................ G01M 11/3181; G01M 11/3109
See application file for complete search history.

(56) References Cited

U.S. PATENT DOCUMENTS

| | | | | |
|---|---|---|---|---|
| 2007/0132985 | A1* | 6/2007 | Palmieri | G01M 11/3181 356/73.1 |
| 2009/0304322 | A1* | 12/2009 | Davies | G01M 11/3109 385/12 |
| 2014/0176937 | A1* | 6/2014 | Liu | G01D 5/35329 356/73.1 |
| 2022/0050013 | A1* | 2/2022 | Champavere | G01D 5/35361 |

* cited by examiner

*Primary Examiner* — Tarifur R Chowdhury
*Assistant Examiner* — Akbar H. Rizvi

(57) ABSTRACT

A cable identification system is provided. The cable identification system may include a laser pulse generator configured to emit laser pulses into the first optical-fiber cable segment. The cable identification system may include a polarization disturbance device configured to induce a change in polarization of a second optical-fiber cable segment via changing a position of the second optical-fiber cable segment. The cable identification system may include a polarization detection device configured to determine measures of polarization based upon backscattered light received from the first optical-fiber cable segment when the second optical-fiber cable segment has different positions. The polarization detection device may be configured to determine whether the first optical-fiber cable segment is connected to the second optical-fiber cable segment based upon the measures of polarization.

20 Claims, 10 Drawing Sheets

SYSTEM AND METHOD FOR CABLE IDENTIFICATION

BACKGROUND

Optical-fiber cables may comprise optical fibers that are used to carry light. Different types of optical-fiber cables may be used in various applications, such as long distance telecommunication, high-speed data connection between different parts of a building, etc. Managing optical-fiber cables may be a difficult task due to unlabeled and/or mislabeled cables, cables being tangled with each other, etc.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1A:
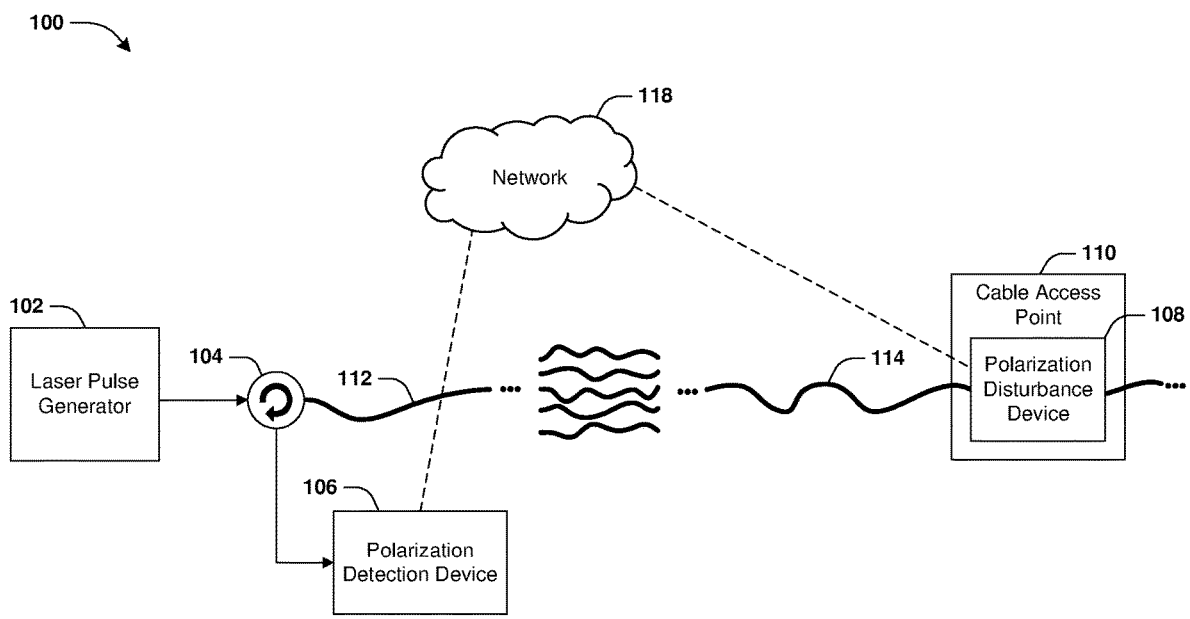
FIG. 1A is an illustration of a schematic view of a cable identification system, according to some embodiments.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as structures, apparatuses, methods, devices, components, and/or systems. Accordingly, this subject matter is not intended to be construed as limited to any example embodiments set forth herein. Rather, example embodiments are provided merely to be illustrative.

The following provides a discussion of some types of scenarios in which the disclosed subject matter may be utilized and/or implemented.

Optical-fiber cables (which may be also referred to as fiber-optic cables) are used in various applications such as telecommunication (e.g., long distance telecommunication), data-transfer (e.g., high speed data connection in a network, such as a private network and/or a public network), etc. An optical-fiber cable may transfer data by conducting light (e.g., infrared light, such as invisible infrared light) between optical transceivers. For example, light emitted into the optical-fiber cable by a first optical transceiver (connected to a first end of the optical-fiber cable, for example) may be conducted to a destination (e.g., a second optical transceiver). An optical communication station (e.g., at least one of a central office (CO), a headend (HE), a mobile switch center (MSC), etc.) may transmit and receive communication signals via an optical network (e.g., an optical distribution network (ODN)) comprising tens, hundreds, and/or thousands, etc. of optical-fiber cables connected to terminals (e.g., optical network terminals (ONTs)) that may be located at different locations. The communication signals may be transmitted and received to provide services, such as at least one of voice services, text services, data services, etc., to clients.

Along the cable route of optical-fiber cables in the optical network to one or more respective terminals, there may be access points comprising cable segments of the optical-fiber cables. The cable segments may be physically accessed and/or handled (by a technician, a robot, etc.) via the access points, such as for configuring connections between cables in the access points, implementing new cables through the access points, etc. An access point may comprise at least one of a cable storage structure, a handhole, a manhole, a slack cable bundle, a cabinet, etc.

While troubleshooting, installation, or the like, a need may arise to identify a cable segment in the optical network that is connected to (e.g., is a continuation of) a first cable segment. The first cable segment may be connected to a first port and/or may be configured to conduct optical signals between the first port (e.g., a port in the optical communication station) and one or more terminals (e.g., one or more ONTs). The identification of the cable segment may be performed for the purpose of (i) performing maintenance to improve and/or reestablish a connection between the first port and the one or more terminals, (ii) labeling the identified cable segment (as being connected to the first cable segment and/or the first port), and/or (iii) establishing a new connection to the first port via the identified cable segment, for example. However, the desired cable segment (that is connected to the first cable segment and/or the first port) may be among (and/or physically surrounded by) numerous other cable segments in an access point, and oftentimes, manually identifying the desired cable segment can be a difficult task due to (i) there being damage to the access point and/or the cable segments in the access point (e.g., the damage may be a result of fires, disasters, weather events such as hurricanes, tornadoes, etc.), (ii) cable segments in the access point not having labels that indicate which cable segment corresponds to which port in the optical communication station, and/or (iii) cable segments in the access point being mislabeled (e.g., a label of a cable segment may indicate an incorrect port), for example.

Thus, in accordance with the present disclosure, a cable identification system for identifying optical-fiber cables is provided. The cable identification system may comprise a laser pulse generator, a polarization disturbance device and/or a polarization detection device. The cable identification system may determine whether a first cable segment (e.g., an optical-fiber cable segment in the optical communication station) is connected to a second cable segment (e.g., an optical-fiber cable segment in the access point).

The laser pulse generator may be connected to the first cable segment (via a fiber port of the first cable segment, for example) and may emit laser pulses that propagate through the first cable segment in a first direction. Backscattered light may be propagated through the first cable segment in a second direction (opposite the first direction). For example, the backscattered light may be formed as a result of backscattering (e.g., Rayleigh backscattering) that occurs in the first cable segment in which at least some light of a laser pulse is reflected back towards a direction in which the laser pulse came.

The second cable segment may be mounted to and/or supported by the polarization disturbance device, which may induce a change in polarization of the second cable segment by changing a position of the second cable segment. For example, the polarization disturbance device may move (e.g., at least partially rotate) the second cable segment via a movement process to induce the change in polarization.

The polarization detection device may be connected to the first cable segment, and may determine measures of polarization based upon backscattered light received from the first cable segment. For example, the measures of polarization may comprise states of polarization, of the backscattered light, measured by the polarization detection device. If the second cable segment is connected to the first cable segment, then the change in polarization of the second cable segment induced by the polarization disturbance device may have an impact (on the measures of polarization, for example) which may be detected by the polarization detection device. For example, if the second cable segment is connected to the first cable segment, then backscattered light in the second cable segment (e.g., whose polarization is changed by the polarization disturbance device) flows from the second cable segment back to the first cable segment, where the change in polarization (induced by the polarization disturbance device) can be detected by the polarization detection device by measuring the backscattered light received through the first cable segment. However, if the second cable segment is not connected to the first cable segment, then the change in polarization of the second cable segment induced by the polarization disturbance device may not have an impact that is detectable by the polarization detection device (e.g., light in the second cable segment that is impacted by the polarization disturbance device does not flow back to the first cable segment since the two cable segments are not connected). Accordingly, the polarization detection device may determine whether the second cable segment is connected to the first cable segment based upon whether the measures of polarization (determined by the polarization detection device) are reflective of the change in polarization induced by the polarization disturbance device.

The polarization detection device may be in communication with the polarization disturbance device, and may automatically determine, via the communication, when to perform polarization measurements in association with the movement process. Accordingly, the techniques provided herein may result in reduced resource usage as compared to some systems where at least two technicians must simultaneously handle and/or look at the first cable segment and the second cable segment respectively to determine whether they are connected.

The polarization detection device may transmit a message, to the polarization disturbance device, indicating whether the second cable segment is connected to the first cable segment. An output device of the polarization disturbance device may output an indication based upon the message, thereby informing a technician, a robot, etc. whether the second cable segment is connected to the first cable segment.

Accordingly, the cable identification system may provide for accurate identification of cables, even in situations in which the cables are not labeled or are mislabeled, thereby significantly increasing operation efficiency for managing cables in the optical communication station, the optical network and/or one or more access points. Alternatively and/or additionally, using the techniques provided herein to implement the cable identification system may provide for significantly reduced costs (e.g., 90% cost savings as compared to some systems that may be used for identifying cables).

In some examples, one or more actions may be performed (by the technician, the robot, etc., for example) in response to determining that the second cable segment is connected to the first cable segment (and/or in response to the output device indicating that the second cable segment is connected to the first cable segment). The one or more actions may comprise (i) performing maintenance to improve and/or reestablish a connection between the first cable segment and one or more terminals, (ii) replacing at least a portion of the second cable segment (e.g., a damaged portion of the second cable segment) with a new cable segment, (iii) labeling the second cable segment (as being connected to the first cable segment), (iv) establishing a new connection to the first cable segment via the second cable segment, and/or (v) splicing the second cable segment, for example.

FIG. 1A illustrate a cable identification system 100, according to some embodiments. The cable identification system 100 may comprise a laser pulse generator 102, an optical circulator 104, a polarization detection device 106, and/or a polarization disturbance device 108. The cable identification system 100 may be used to determine whether a first cable segment 112 (e.g., an optical-fiber cable segment in an optical communication station) is connected to a second cable segment 114 (e.g., an optical-fiber cable segment in an access point 110). The polarization detection device 106 may be in communication with the polarization disturbance device 108 over a network 118 (e.g., a wireless network). For example, communication between the polarization detection device 106 and the polarization disturbance device 108 may be performed using a first Communication device 212 (shown in FIG. 2A) of the polarization disturbance device 108 and a second communication device 312 (shown in FIG. 3) of the polarization detection device 106. The communication may be performed via cellular service (e.g. 5G service, 4G service and/or other type of cellular service) and/or other wireless service.

Figure 1B:
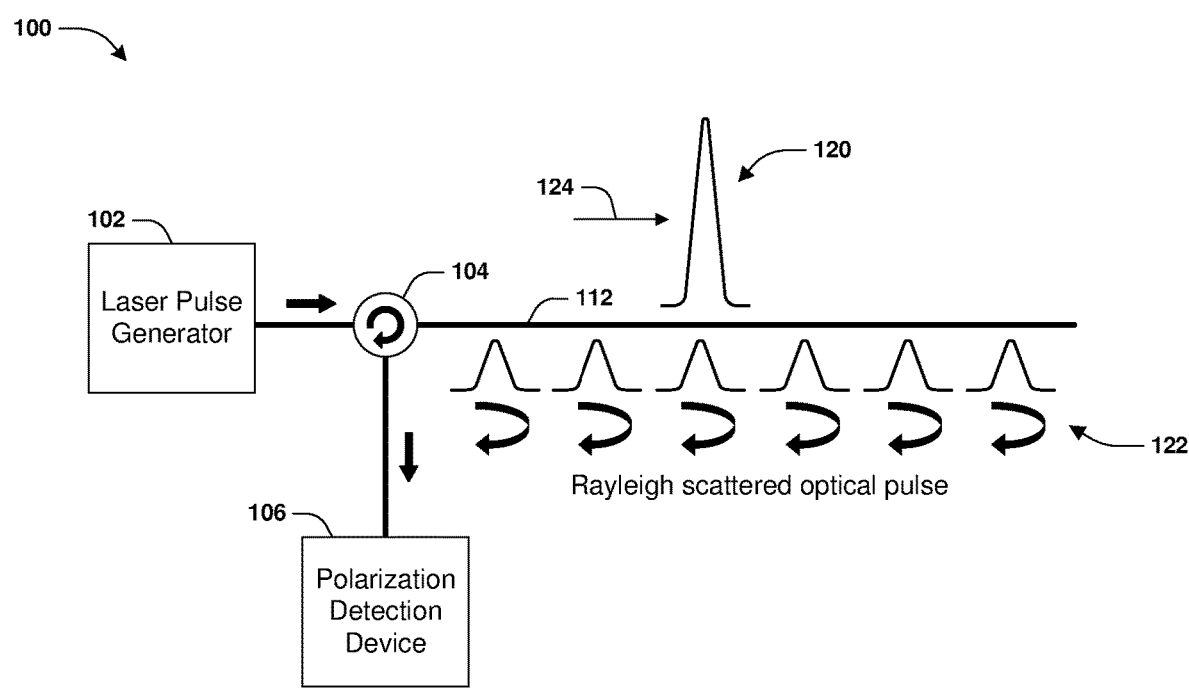
FIG. 1B is an illustration of a schematic view of a cable identification system, according to some embodiments.

In some examples, the laser pulse generator 102 and/or the polarization detection device 106 may be connected to the first cable segment 112 (via a fiber port of the first cable segment 112, for example). The optical circulator 104 may connect the laser pulse generator 102 and/or the polarization detection device 106 to the first cable segment 112. FIG. 1B illustrates the laser pulse generator 102 emitting laser pulses into the first cable segment 112 and/or backscattered light being conducted from the first cable segment 112 to the polarization detection device 106, according to some embodiments. In some examples, laser pulses may be emitted by the laser pulse generator 102 into the first cable segment 112 at a rate of at least about 100 laser pulses per second, and/or a rate of at least about 1000 laser pulses per second (e.g., a rate between about 1000 laser pulses per second and about 3000 laser pulses per second). The optical circulator 104 may conduct laser pulses generated by the laser pulse generator 102 to the first cable segment 112. For example, a first laser pulse 120 generated by the laser pulse generator 102 may be conducted to the first cable segment 112 and may propagate through the first cable segment 112 in a first direction 124. Backscattered light 122 (e.g., Rayleigh scattered optical pulses) may propagate through the first cable segment 112 in a second direction (opposite the first direction 124). For example, the backscattered light 122 may be formed as a result of backscattering (e.g., Rayleigh backscattering) of the first laser pulse 120 that occurs in the first cable segment 112. The backscattering may comprise at least some light of the first laser pulse 120 being reflected back towards the second direction. The optical circulator 104 may conduct the backscattered light 122 from the first cable segment 112 to the polarization detection device 106.

The polarization disturbance device 108 (shown in FIG. 1A) may be configured to induce a change in polarization of the second cable segment 114 via changing a position of the second cable segment 114. The polarization detection device 106 determines measures of polarization based upon backscattered light received from the first cable segment 112 (before, after and/or during the position changing of the second cable segment 114, for example). If the first cable segment 112 is connected to the second cable segment 114, the measures of polarization (of the backscattered light received from the first cable segment 112) may be impacted by the position changing by the polarization disturbance device 108. The polarization detection device 106 may thus determine whether the first cable segment 112 is connected to the second cable segment 114 based upon the measures of polarization.

FIGS. 2A-2G illustrate examples of the polarization disturbance device 108, according to some embodiments. The polarization disturbance device 108 may be disposed proximal and/or within the access point 110 (shown in FIG. 1A). The access point 110 may comprise at least one of a cable storage structure, a handhole (e.g., a handhole for storing and/or splicing one or more optical-fiber cables), a manhole (e.g., a manhole for storing and/or splicing one or more optical-fiber cables), a slack cable bundle, a cabinet (e.g., a cabinet for storing and/or splicing one or more optical-fiber cables), etc. A technician, a robot, etc. may physically access and/or handle the second cable segment 114 via the access point 110.

Figure 2A:
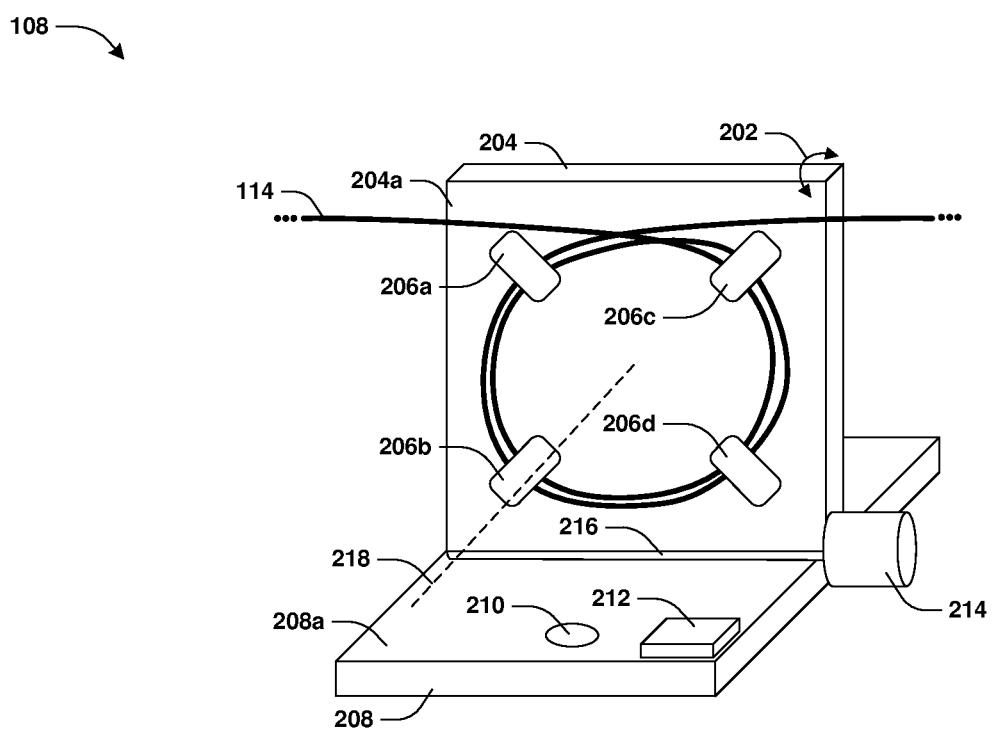
FIG. 2A is an illustration of a perspective view of a polarization disturbance device, according to some embodiments.

FIG. 2A illustrates the polarization disturbance device 108 according to some embodiments. The polarization disturbance device 108 may comprise a plate 204, a cable support assembly, a base 208, an output device 210, the first communication device 212 and/or a movement assembly configured to move (e.g., at least partially rotate) the plate 204, such as along directions 202.

Figure 2B:
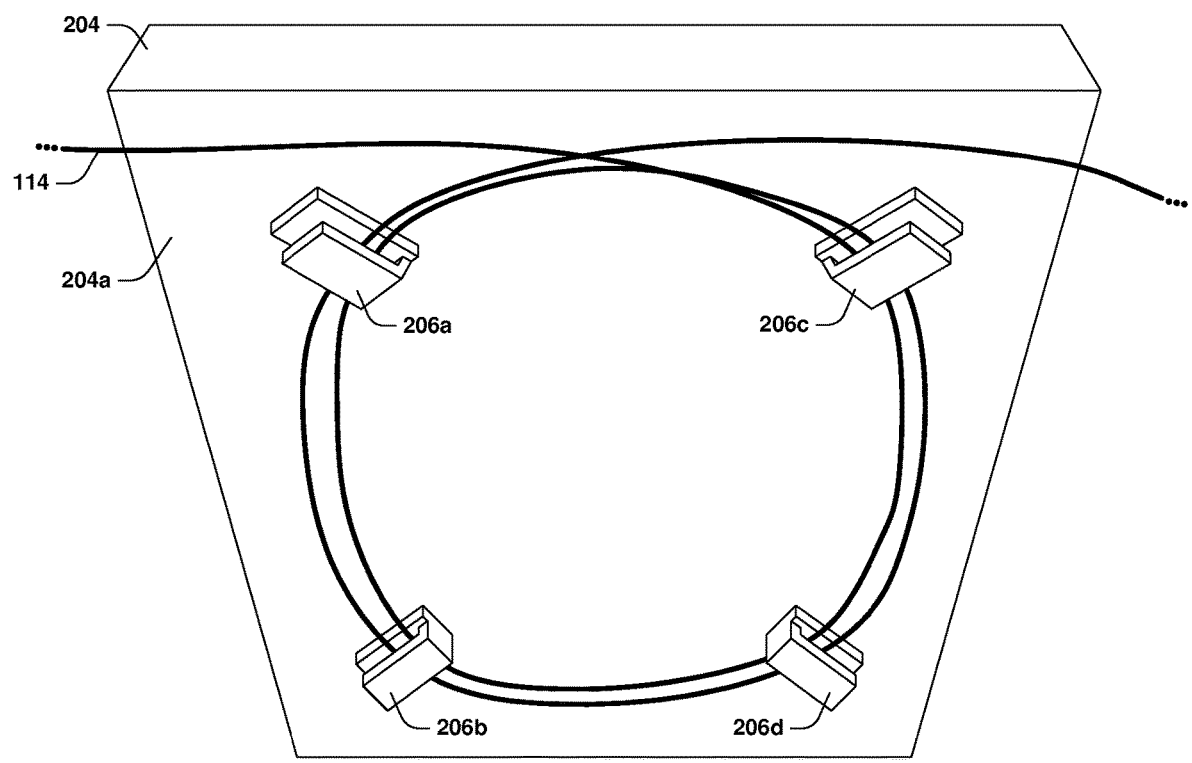
FIG. 2B is an illustration of an enlarged and/or close-up view of one or more cable support components of a polarization disturbance device, according to some embodiments.

In an example, the cable support assembly may be connected to (e.g., attached to) the plate 204 and/or may be configured to support the second cable segment 114 proximate the plate 204. The cable support assembly may comprise one or more cable support components attached to the plate 204. Although FIG. 2A shows four cable support components 206a-206d, any number of cable support components are within the scope of the present disclosure. A cable support component of the one or more cable support components may comprise at least one of a hook, a cable clip, a clamp, a peg, a clasp, etc. that may support (e.g., hold and/or secure) the second cable segment 114 proximate the plate 204 (e.g., the second cable segment 114 may be held in place, clasped, clipped and/or fastened using the cable support component). FIG. 2B illustrates an enlarged and/or close-up view of an example of the one or more cable support components (e.g., cable support components 206a-206d) supporting the second cable segment 114, according to some embodiments.

In the access point 110, the second cable segment 114 may have slack enabling the second cable segment 114 to be wound (by the technician, the robot, etc., for example) around the cable support assembly one or more times, such as one time, two times, three times, etc. The second cable segment 114 may thus have a coiled state with one or more windings (e.g., one winding, two windings, three windings, etc.). The one or more cable support components may be positioned such that the one or more windings of the second cable segment 114 form a substantially circular (and/or elliptical) shape. Although FIG. 2A shows the second cable segment 114 having two windings (e.g., the second cable segment 114 is wound around the cable support assembly two times), any number of windings are within the scope of the present disclosure. The cable support assembly (e.g., the cable support components 206a-206d) may maintain the coiled state of the second cable segment 114. In some examples, the second cable segment 114 may be wound around an axis 218 that is orthogonal to a plane within which a greatest extent of the plate 204 lies (e.g., the axis 218 may be orthogonal to a surface 204a of the plate 204).

Figure 2C:
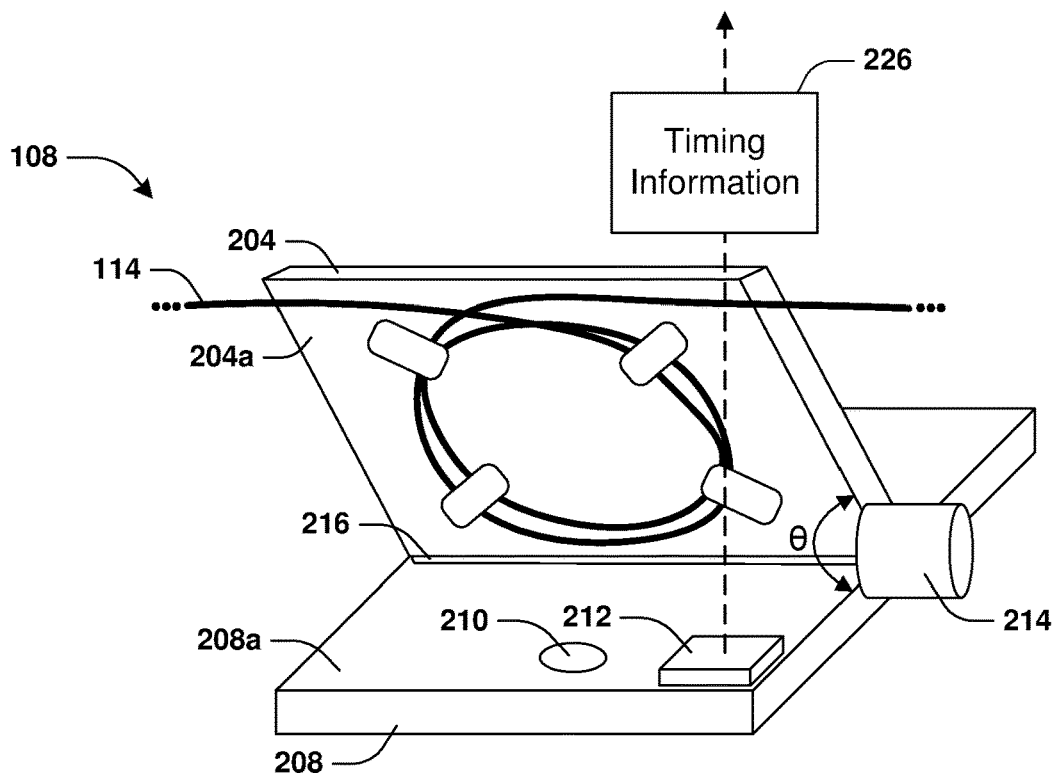
FIG. 2C is an illustration of a perspective view of a polarization disturbance device transmitting a timing information message, according to some embodiments.

FIG. 2C illustrates the first communication device 212 transmitting a timing information message 226 to the second communication device 312 (shown in FIG. 3) of the polarization detection device 106, according to some embodiments. The timing information message 226 may comprise timing information, which may be used by the polarization detection device 106 to determine one or more times of one or more positions of the plate 204 and/or the second cable segment 114. In an example, the timing information may be indicative of a position of the plate 204 and/or the second cable segment 114 and/or may be indicative of a time at which the plate 204 and/or the second cable segment 114 have the position. The position may correspond to an angle θ of the plate 204 relative to the base 208 (e.g., angle θ of the surface 204a of the plate 204 relative to a top surface 208a of the base 208).

The movement assembly may comprise a motor 214 and/or a shaft 216. The motor 214 may be connected to the plate 204. In an example, the motor 214 may be connected to the plate 204 via the shaft 216 (e.g., the motor 214 may be attached to the shaft 216, which may be attached to the plate 204). The movement assembly may be configured to move (e.g., at least partially rotate) the plate 204 (e.g., the motor 214 may move the plate 204 by rotating the shaft 216). In an example, the movement assembly may be configured to rotate the plate 204 by up to 180 degrees (or other amount), such as from a position of the plate 204 where the angle θ is 0 degrees (or other value) to a position of the plate 204 where the angle θ is 180 degrees (or other value).

Figure 2D:
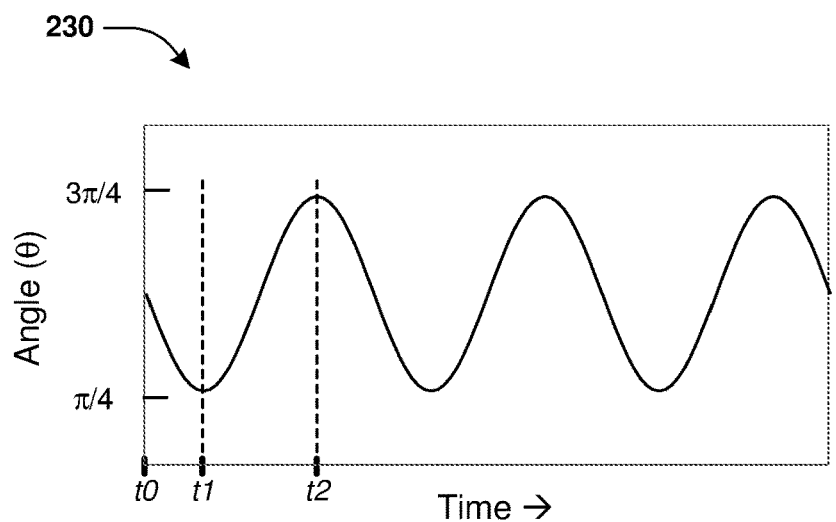
FIG. 2D is an illustration of a movement profile, according to some embodiments.

The movement assembly may be configured to move (e.g., at least partially rotate) the plate 204 based upon a movement profile. For example, the movement profile may be indicative of one or more positions (e.g., angles) of the plate 204, one or more speeds of movement of the plate 204, and/or other information associated with moving the plate 204. FIG. 2D illustrates an exemplary movement profile 230, according to some embodiments. The exemplary movement profile 230 may be indicative of values of the angle θ of the plate 204 (relative to the base 208) over time (e.g., the angle θ is shown in FIG. 2C). In an example in which the exemplary movement profile 230 is used by the movement assembly of the polarization disturbance device 108 to perform a movement process, the angle θ may be 90 degrees (π/2 rad) at starting time t0 of the movement process. Between time t0 and time t1, the movement assembly may move (e.g., rotate) the plate 204 until the angle θ is 45 degrees (π/4 rad) at time t1. Between time t1 and time t2, the movement assembly may move (e.g., rotate) the plate 204 until the angle θ is 135 degrees (3π/4 rad) at time t2. The movement assembly may perform one or more cycles of moving the plate 204 between the angle θ of 45 degrees and the angle θ of 135 degrees.

In some examples, the polarization detection device 106 (shown in FIG. 1A) may be provided with profile information associated with the movement profile. For example, the profile information may be indicative of one or more times and/or one or more positions of the plate 204 and/or the second cable segment 114 (e.g., values of the angle θ of the plate 204 relative to the base 208) according to the movement profile. In an example, the profile information may be included (by the polarization disturbance device 108) in the timing information message 226 (shown in FIG. 2C) transmitted to the polarization detection device 106, and the polarization detection device 106 may access the profile information upon receiving the timing information message 226. Alternatively and/or additionally, the profile information may be stored on the polarization detection device 106 prior to transmission of the timing information message 226. In an example in which the profile information is stored on the polarization detection device 106 prior to transmission of the timing information message 226, the timing information message 226 may be indicative of a single time (e.g., the starting time t0 of the movement process), where the polarization detection device 106 may determine one or more other times (associated with one or more positions of the plate 204 and/or the second cable segment 114) based upon the single time. For example, the polarization detection device 106 may extrapolate the other times of the positions from the single time indicated by the timing information message 226 and the profile information already stored on the polarization detection device 106. Alternatively and/or additionally, the polarization detection device 106 may transmit the profile information (indicative of the movement profile, for example) to the polarization disturbance device 108, and/or may instruct the polarization disturbance device 108 to move the plate 204 in accordance with the movement profile (based upon the profile information).

Moving (e.g., at least partially rotating) the plate 204 to change the angle θ (shown in FIG. 2C) may induce a change in polarization (e.g., a change in state of polarization) of the second cable segment 114, such as a change in polarization of light (e.g., laser pulses and/or backscattered light) in the second cable segment 114. The change in polarization of the second cable segment 114 may be due, at least in part, to the second cable segment 114 being in the coiled state when the plate 204 is rotated. The induced change in polarization may be detectable by the polarization detection device 106 if the second cable segment 114 is connected to the first cable segment 112. Based upon the timing information message 226 (and/or the profile information), the polarization detection device 106 may determine one or more times of one or more positions of the plate 204 (e.g., the one or more positions may correspond to values of the angle θ). Based upon the one or more times and/or the one or more positions, the polarization detection device 106 may (i) perform polarization measurements (e.g., measurements of states of polarization) of backscattered light received from the first cable segment 112, and/or (ii) determine whether the second cable segment 114 is connected to the first cable segment 112 based upon the polarization measurements. In some examples, a measure of polarization (e.g., a state of polarization) determined by the polarization detection device 106 may be represented by a set of parameters (e.g., Stokes parameters) $S_0$, $S_1$, $S_2$ and/or $S_4$, where (i) $S_0=E_x^2+E_y^2$, (ii) $S_1=E_x^2-E_y^2$, (iii) $S_2=2E_xE_y \cos \delta$, and/or (iv) $S_3=2E_xE_y \sin \delta$.

Figure 2E:
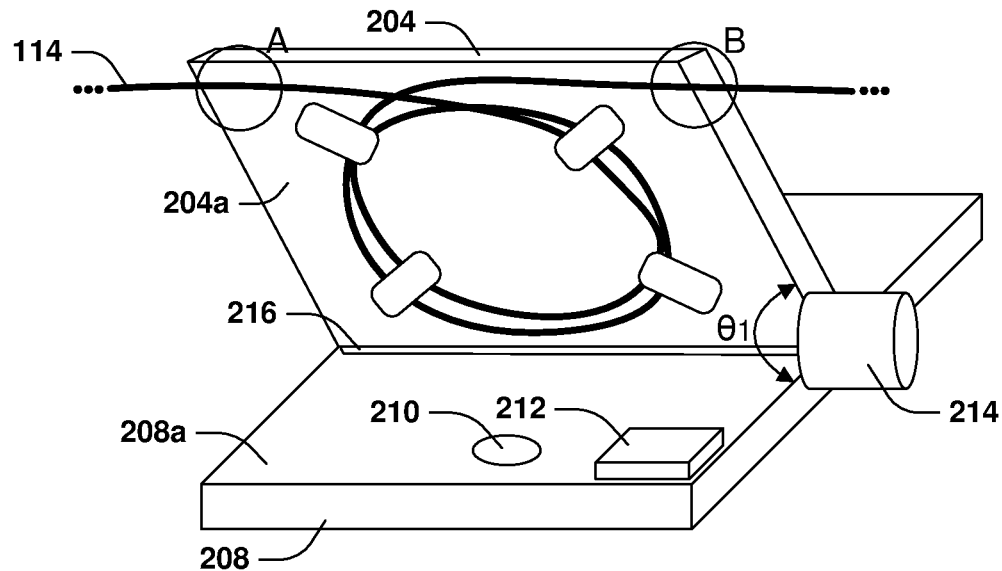
FIG. 2E is an illustration of a perspective view of a polarization disturbance device when a second cable segment is in a first position, according to some embodiments.
Figure 2F:
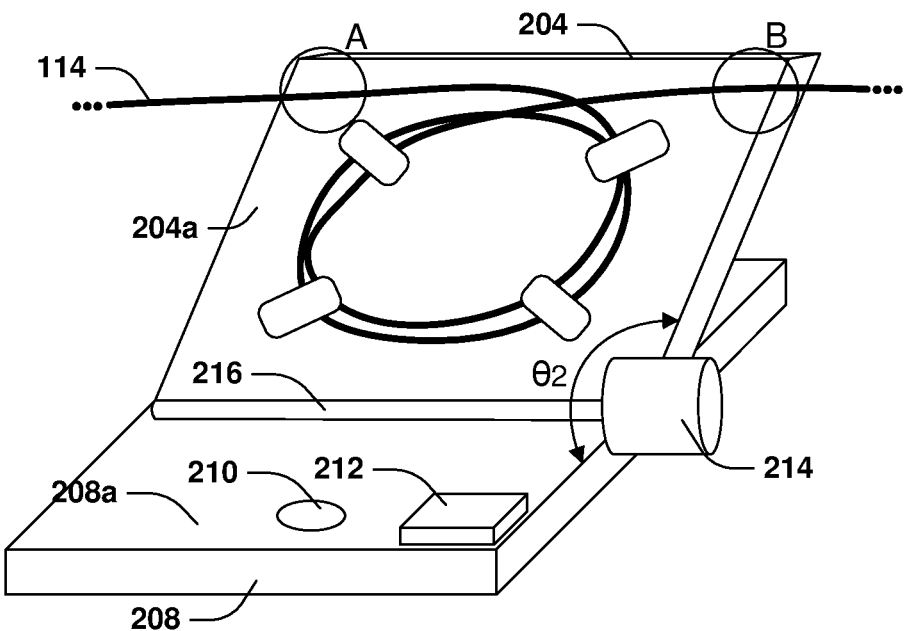
FIG. 2F is an illustration of a perspective view of a polarization disturbance device when a second cable segment is in a second position, according to some embodiments.

FIGS. 2E-2F illustrate the plate 204 and/or the second cable segment 114 being moved (e.g., at least partially rotated) from a first position shown in FIG. 2E to a second position shown in FIG. 2F, according to some embodiments. The first position shown in FIG. 2E may correspond to a position in which the angle θ is $\theta_1$ (e.g., 45 degrees). The second position shown in FIG. 2F may correspond to a position in which the angle θ is $\theta_2$ (e.g., 135 degrees). The plate 204 may be moved (e.g., at least partially rotated) using the motor 214 according to the movement profile. In an example, the second cable segment 114 may have the first position and/or the angle θ may be 45 degrees (as shown in FIG. 2E) at time t1. The second cable segment 114 may have the second position and/or the angle θ may be 135 degrees (as shown in FIG. 2F) at time t2.

The polarization detection device 106 (shown in FIG. 1A) may determine a first measure of polarization based upon first backscattered light received from the first cable segment 112 when the second cable segment 114 has the first position shown in FIG. 2E (e.g., when the angle θ is 81, such as 45 degrees). In some examples, the first backscattered light may be conducted to the polarization detection device 106 as a result of one or more laser pulses, emitted into the first cable segment 112, by the laser pulse generator 102. In an example, the polarization detection device 106 may determine the first measure of polarization, using the first backscattered light received at time t1, based upon the timing information message 226 received from the polarization disturbance device 108 (e.g., the polarization detection device 106 may determine to measure polarization at time t1 based upon the timing information message 226). The polarization detection device 106 may determine a second measure of polarization based upon second backscattered light received from the first cable segment 112 when the second cable segment 114 has the second position shown in FIG. 2F (e.g., when the angle θ is $\theta_2$, such as 135 degrees). In some examples, the second backscattered light may be conducted to the polarization detection device 106 as a result of one or more laser pulses, emitted into the first cable segment 112, by the laser pulse generator 102. In an example, the polarization detection device 106 may determine the second measure of polarization, using the second backscattered light received at time t2, based upon the timing information message 226 received from the polarization disturbance device 108 (e.g., the polarization detection device 106 may determine to measure polarization at time t2 based upon the timing information message 226). The first backscattered light and the second backscattered light may be conducted, by the optical circulator 104, to the polarization detection device 106 (as shown in FIG. 1B, for example).

In some examples, if the second cable segment 114 is connected to the first cable segment 112, then the position of the second cable segment 114 (e.g., the angle θ) has an impact on polarization measurements performed by the polarization detection device 106, such as the first measure of polarization and/or the second measure of polarization. Accordingly, moving the plate 204 and/or the second cable segment 114 to change the angle θ from $θ_1$ (e.g., 45 degrees) in FIG. 2E to $θ_2$ (e.g., 135 degrees) in FIG. 2F may cause a detectable polarization change from the first measure of polarization to the second measure of polarization if the second cable segment 114 is connected to the first cable segment 112. The polarization detection device 106 may determine a first polarization change based upon the first measure of polarization and the second measure of polarization. The polarization detection device 106 may compare the first polarization change with a range of polarization changes (e.g., a defined range of polarization changes). The range of polarization changes may be associated with the movement profile (e.g., the profile information provided to the polarization detection device 106 may be indicative of the range of polarization changes). The range of polarization changes may comprise polarization changes expected to occur as a result of moving the second cable segment 114 and/or the plate 204 (according to the movement profile, for example) from the first position to the second position. Accordingly, the polarization detection device 106 may determine whether the second cable segment 114 is connected to the first cable segment 112 based upon whether the first polarization change is within the range of polarization changes. For example, the polarization detection device 106 may determine that the second cable segment 114 is connected to the first cable segment 112 based upon a determination that the first polarization change is within the range of polarization changes (e.g., moving the second cable segment 114 from the first position to the second position had the expected impact on measures of polarization of backscattered light measured by the polarization detection device 106). Alternatively and/or additionally, the polarization detection device 106 may determine that the second cable segment 114 is not connected to the first cable segment 112 based upon a determination that the first polarization change is outside the range of polarization changes (e.g., moving the second cable segment 114 from the first position to the second position did not have the expected impact on measures of polarization of backscattered light measured by the polarization detection device 106).

In some examples, the first measure of polarization may comprise a first state of polarization of the first backscattered light from the first cable segment 112, and/or the second measure of polarization may comprise a second state of polarization of the second backscattered light from the first cable segment 112.

In some examples, the first measure of polarization and/or the second measure of polarization may be associated with a section A-B (from point A to point B) of the second cable segment 114 (shown in FIGS. 2E and 2F). The section A-B of the second cable segment 114 may comprise a coiled section comprising one or more windings (wound around the cable support assembly, for example). In an example, the first measure of polarization may correspond to backscattered light from the section A-B of the second cable segment 114 at time t1 (and/or when the second cable segment 114 has the first position shown in FIG. 2E).

In some examples, the first measure of polarization may be determined based upon a first point A polarization measure, $P_A$, associated with backscattered light from point A of the second cable segment 114 and/or a first point B polarization measure, $P_B$, associated with backscattered light from point B of the second cable segment 114. $P_A$ may be a measure of polarization (e.g., a state of polarization) of backscattered light from point A when the second cable segment 114 has the first position shown in FIG. 2E. The backscattered light that is measured to determine $P_A$ may be generated at point A as a result of a laser pulse generated by the laser pulse generator 102. For example, the backscattered light that is measured to determine $P_A$ may correspond to light, of the laser pulse, that is backscattered (e.g., reflected) at point A of the second cable segment 114 and travels from point A to the polarization detection device 106. The polarization detection device 106 may identify the backscattered light that is generated at point A of the second cable segment 114 (and measure the backscattered light to determine $P_A$, for example) based upon a distance between the polarization detection device 106 and point A of the second cable segment 114 (e.g., the distance may be determined by and/or known to the polarization detection device 106). For example, a light reception time (e.g., time t1) at which the backscattered light reaches the polarization detection device 106 may be determined based upon the distance and a laser pulse generation time at which the laser pulse is generated and/or emitted into the first cable segment 112 (e.g., the laser pulse generation time may be determined based upon an indication that is transmitted by the laser pulse generator 102 to the polarization detection device 106 when the laser pulse generator 102 generates the laser pulse). Thus, the polarization detection device 106 may measure the backscattered light received at the light reception time (determined based upon the distance and the laser pulse generation time) to determine $P_A$. In an example, $P_A = P(A,t1) + \Sigma(A \text{ to detector}, t1)$, where: (i) $P(A,t1)$ corresponds to a polarization (e.g., a state of polarization) of the backscattered light when the backscattered light is initially generated at point A, wherein the polarization, $P(A,t1)$, may be dependent upon a polarization of the laser pulse when the laser pulse is backscattered at point A to generate the backscattered light, and/or (ii) $\Sigma(A \text{ to detector}, t1)$ corresponds to an accumulation of polarization changes applied to the backscattered light while the backscattered light travels from point A to the polarization detection device 106. The accumulation of polarization changes may be applied by polarization interferences along cable (e.g. at least some of the second cable segment 114 and/or at least some of the first cable segment 112) through which the backscattered light is propagated from point A to the polarization detection device 106. The polarization interferences may comprise (i) temperature changes, (ii) changes in direction of propagation of the backscattered light (e.g., as a result of twists and/or bends in the cable, and/or (iii) other factors that change polarization of the backscattered light.

$P_B$ may be a measure of polarization (e.g., a state of polarization) of backscattered light from point B when the second cable segment 114 has the first position shown in FIG. 2E. For example, the backscattered light that is measured to determine $P_B$ may be generated at point B as a result of a laser pulse (e.g., the same laser pulse that generates the backscattered light measured to determine $P_A$) generated by the laser pulse generator 102. The measuring of backscattered light from point B to determine $P_B$ may be performed after (e.g., immediately after) the measuring of backscattered light from point A to determine $P_A$. A time duration between the measuring of backscattered light from point B to determine $P_B$ and the measuring of backscattered light from point A to determine $P_A$ may be based upon a length of the section A-B of the second cable segment 114 (e.g., the time duration may correspond to a time it takes for light to travel from point B to point A). The length of the section A-B may be in the range of between about 10 centimeters and about 30 meters. The time duration may be at most about 200 nanoseconds. In an example, $P_B$=P(B, t1)+E(A to detector, t1)+$\Sigma$(B to A, t1), where (i) P(B, t1) corresponds to a polarization (e.g., a state of polarization) of the backscattered light when the backscattered light is initially generated at point B, wherein the polarization, P(B, t1), may be dependent upon a polarization of the laser pulse when the laser pulse is backscattered at point B to generate the backscattered light, and/or (ii) $\Sigma$(B to A, t1) corresponds to an accumulation of polarization changes applied to the backscattered light while the backscattered light travels from point B to point A.

In some examples, the first measure of polarization (associated with the section A-B of the second cable segment 114 at time t1, for example) may correspond to a difference between $P_A$ and $P_B$. By taking the difference between $P_A$ and $P_B$ to determine the first measure of polarization, $\Sigma$(A to detector, t1) corresponding to the accumulation of polarization changes outside the section A-B of the second cable segment 114 may be canceled out and/or reduced from the first measure of polarization. In this way, polarization changes associated with polarization interferences outside the section A-B of the second cable segment 114 may be mitigated, reduced, disregarded, excluded and/or eliminated from the first measure of polarization such that the first measure of polarization is a localized state of polarization associated with the section A-B of the second cable segment 114.

In an example, the second measure of polarization may correspond to backscattered light from the section A-B of the second cable segment 114 at time t2 (and/or when the second cable segment 114 has the second position shown in FIG. 2F). The second measure of polarization may be determined using one or more of the techniques provided herein with respect to determining the first measure of polarization. For example, the second measure of polarization may be determined based upon a second point A polarization measure, $P_A'$, associated with backscattered light from point A of the second cable segment 114 and/or a second point B polarization measure, $P_B'$, associated with backscattered light from point B of the second cable segment 114. $P_A'$ may be a measure of polarization (e.g., a state of polarization) of backscattered light from point A when the second cable segment 114 has the second position shown in FIG. 2F. $P_B'$ may be a measure of polarization (e.g., a state of polarization) of backscattered light from point B when the second cable segment 114 has the second position shown in FIG. 2F. $P_A'$ and/or $P_B'$ may be determined using one or more of the techniques provided herein with respect to determining $P_A$ and/or $P_B$, respectively. In some examples, the second measure of polarization (associated with the section A-B of the second cable segment 114 at time t2, for example) may correspond to a difference between $P_A'$ and $P_B'$. By taking the difference between $P_A'$ and $P_B'$ to determine the second measure of polarization, polarization changes associated with polarization interferences outside the section A-B of the second cable segment 114 may be mitigated, reduced, disregarded, excluded and/or eliminated from the second measure of polarization such that the second measure of polarization is a second localized state of polarization associated with the section A-B of the second cable segment 114.

In some examples, the first polarization change may be determined based upon the first measure of polarization (e.g., the first localized state of polarization associated with the section A-B) and the second measure of polarization (e.g., the second localized state of polarization associated with the section A-B). For example, the first polarization change may correspond to a differentiated state of polarization corresponding to a difference between the first measure of polarization and the second measure of polarization.

Measures of polarization (e.g., the first measure of polarization, the second measure of polarization and/or one or more other measures of polarization) determined using the techniques provided herein may be reflective of localized states of polarization associated with the section A-B of the second cable segment 114. Accordingly, if the second cable segment 114 is connected to the first cable segment 112, the first polarization change (e.g., the differentiated state of polarization) determined using the measures of polarization may be reflective of a local change in polarization associated with the section A-B of the second cable segment 114. The local change in polarization may correspond to a change in polarization, of light in the section A-B, induced by moving the second cable segment 114 from the first position to the second position, whereby other polarization disturbances outside of the section A-B (e.g., other polarization disturbances induced by polarization interferences outside the polarization disturbance device 108) may be mitigated, reduced, disregarded, excluded and/or eliminated from the local change in polarization. In this way, the polarization detection device 106 may use the first polarization change to make a more accurate determination of whether the second cable segment 114 is connected to the first cable segment 112, at least due to the first polarization change being a more accurate representation of the change in polarization induced by the polarization disturbance device 108 (e.g., the first polarization change is less influenced by other polarization disturbances induced by polarization interferences outside the polarization disturbance device 108).

In some examples, in addition to the first measure of polarization and the second measure of polarization, one or more additional measures of polarization (e.g., one or more states of polarization) may be determined by the polarization detection device 106. The one or more additional measures of polarization may be determined at one or more times other than time t1 and/or time t2. Alternatively and/or additionally, the one or more additional measures of polarization may be determined at various positions (other than the first position and the second position, for example) of the second cable segment 114. The one or more additional measures of polarization may be determined using one or more of the techniques provided herein with respect to determining the first measure of polarization and the second measure of polarization. In some examples, in addition to the first polarization change, one or more additional polarization changes (e.g., one or more localized polarization changes associated with section A-B of the second cable segment 114) may be determined based upon the first measure of polarization, the second measure of polarization and/or the one or more additional measures of polarization. Whether the second cable segment 114 is connected to the first cable segment 112 may be determined based upon the first measure of polarization, the second measure of polarization, the one or more additional measures of polarization, the first polarization change and/or the one or more additional polarization changes.

In some examples, the movement profile may be indicative of (i) a plurality of positions (e.g., the first position, the second position and/or one or more other positions) of the first plate 204 and/or the second cable segment 114 (e.g., the plurality of positions may correspond to a plurality of values of the angle θ), and/or (ii) a plurality of speeds (e.g., different speeds) at which the first plate 204 and/or the second cable segment 114 are moved. The motor 204 may perform a movement process based upon the movement profile. In the movement process, the motor 204 moves the plate 204 and/or the second cable segment 114 according to the plurality of positions and/or the plurality of speeds.

In an example, the movement process may comprise (i) moving the plate 204 and/or the second cable segment 114 from the first position (shown in FIG. 2E) to the second position (shown in FIG. 2F) with a first speed (of the plurality of speeds), (ii) moving the plate 204 and/or the second cable segment 114 from the second position to a third position (of the plurality of positions) with a second speed (of the plurality of speeds), and/or (iii) moving the plate 204 and/or the second cable segment 114 from the third position to a fourth position (of the plurality of positions) with a third speed (of the plurality of speeds). The first speed, the second speed and the third speed may be different than each other. Alternatively, two or more of the first speed, the second speed and/or the third speed may be the same.

During the movement process, the polarization detection device 106 may determine a plurality of measures of polarization, such as the first measure of polarization, the second measure of polarization and/or the one or more additional measures of polarization. For example, the plurality of measures of polarization may comprise (i) the first measure of polarization determined when the plate 204 and/or the second cable segment 114 have the first position, (ii) the second measure of polarization determined when the plate 204 and/or the second cable segment 114 have the second position, (iii) one or more measures of polarization during movement of the plate 204 and/or the second cable segment 114 from the first position to the second position at the first speed, (iv) one or more measures of polarization during movement of the plate 204 and/or the second cable segment 114 from the second position to the third position at the second speed, (v) one or more measures of polarization during movement of the plate 204 and/or the second cable segment 114 from the third position to the fourth position at the fourth speed, (vi) a measure of polarization when the plate 204 and/or the second cable segment 114 have the third position, and/or (vii) a measure of polarization when the plate 204 and/or the second cable segment 114 have the fourth position.

In some examples, performing the movement process with different speeds (e.g., the plurality of speeds) and/or across different positions (e.g., the plurality of positions) may result in the movement process inducing changes in polarization having a pattern (e.g., a distinct pattern that is distinct from polarization disturbances induced by polarization interferences outside the polarization disturbance device 108). The polarization detection device 106 may determine that the second cable segment 114 is connected to the first cable segment 112 by recognizing the pattern in the plurality of measures of polarization. In this way, the polarization detection device 106 may use the plurality of measures of polarization to make a more accurate determination of whether the second cable segment 114 is connected to the first cable segment 112, at least due to the changes in polarization induced by the movement process being distinct from other polarization disturbances induced by polarization interferences outside the polarization disturbance device 108 (thereby enabling the polarization detection device 106 to more accurately distinguish the changes in polarization induced by the movement process from the other polarization disturbances, for example).

In some examples, based upon the plurality of measures of polarization, the polarization detection device 106 may determine one or more characteristics of the first cable segment 112 and/or the second cable segment 114, such as at least one of a measure of slack of optical-fiber cable comprising the first cable segment 112 and/or the second cable segment 114, an amount of signal loss of a signal propagated through optical-fiber cable comprising the first cable segment 112 and/or the second cable segment 114, etc. Accordingly, slack and/or high loss locations may be identified using the polarization detection device 106.

In some examples, the polarization disturbance device 108 may comprise one or more batteries configured to power one or more devices (e.g., at least one of the motor 214, the first communication device 212, etc.) of the polarization disturbance device 108. For example, the polarization disturbance device 108 may move the plate 204 and/or communicate with the second communication device 312 using energy from the one or more batteries, and may not require a connection to an external power source (e.g., an outlet) to perform the movement process. Accordingly, the polarization disturbance device 108 may be portable and/or travel-friendly for ease of use in trying to identify a cable segment that is connected to the first cable segment 112.

Figure 2G:
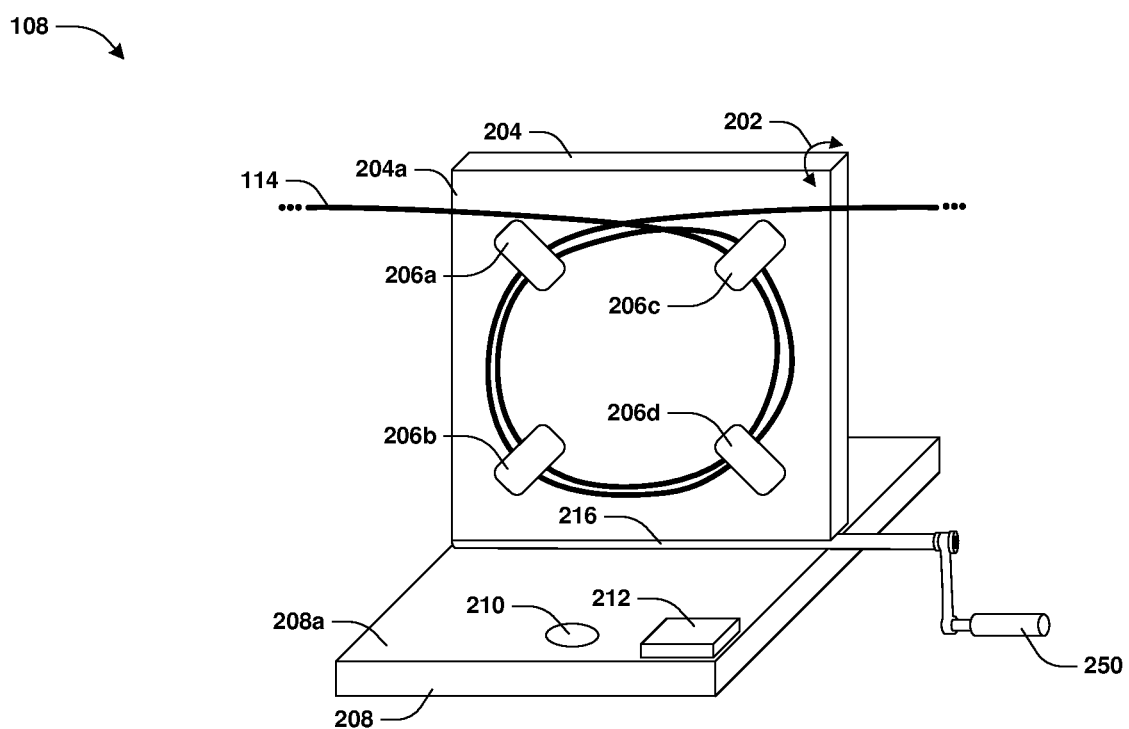
FIG. 2G is an illustration of a perspective view of a polarization disturbance device comprising a manual device, according to some embodiments.

Embodiments are contemplated in which the polarization disturbance device 108 comprises a manual (e.g., human-powered) device (as an alternative to the motor 214, for example). FIG. 2G illustrates the polarization disturbance device 108 according to some embodiments in which the polarization disturbance device 108 comprises a manual device 250, such as a crank (e.g., a hand crank). The manual device 250 may be connected to the plate 204 (e.g., the manual device 250 may be connected to the plate 204 via the shaft 216). The manual device 250 may be operated (by the technician, for example) to move (e.g., at least partially rotate) the plate 204 and/or induce a change in polarization (e.g., a change in state of polarization) of the second cable segment 114.

Embodiments of the polarization disturbance device 108 at least partially different than those shown in and/or described with respect to FIGS. 2A-2G are within the scope of the present disclosure. In some examples, the polarization disturbance device 108 may comprise one or more objects configured to support (e.g., hold and/or secure) the second cable segment 114 in the coiled state. For example, the one or more objects may comprise a plate (e.g., the plate 204) and/or a cable support assembly (e.g., cable support components 206a-206d). As an alternative to and/or in addition to the plate and/or the cable support assembly, the one or more objects may comprise one or more other objects (e.g., configured to support the second cable segment 114 in the coiled state). The one or more objects may be manually held (e.g., gripped, grasped, etc., by a technician, a robot, etc., for example) and/or a position of the second cable segment 114 may be manually changed (e.g., by the technician, the robot, etc.) by manually moving (e.g., at least partially rotating) the one or more objects (and/or the second cable segment 114 in the coiled state) to induce a change in polarization (e.g., a change in state of polarization) of the second cable segment 114 (e.g., by changing the angle θ). In an example in which the one or more objects comprise the plate 204 (e.g., and the second cable segment 114 is supported in the coiled state and proximate the plate 204), the plate 204 may be manually held (e.g., gripped and/or grasped via a handle attached to the plate 204) and/or may be manually moved (e.g., at least partially rotated by the technician, the robot, etc.) to induce a change in polarization (e.g., a change in state of polarization) of the second cable segment 114 (e.g., by changing the angle θ).

Figure 3:
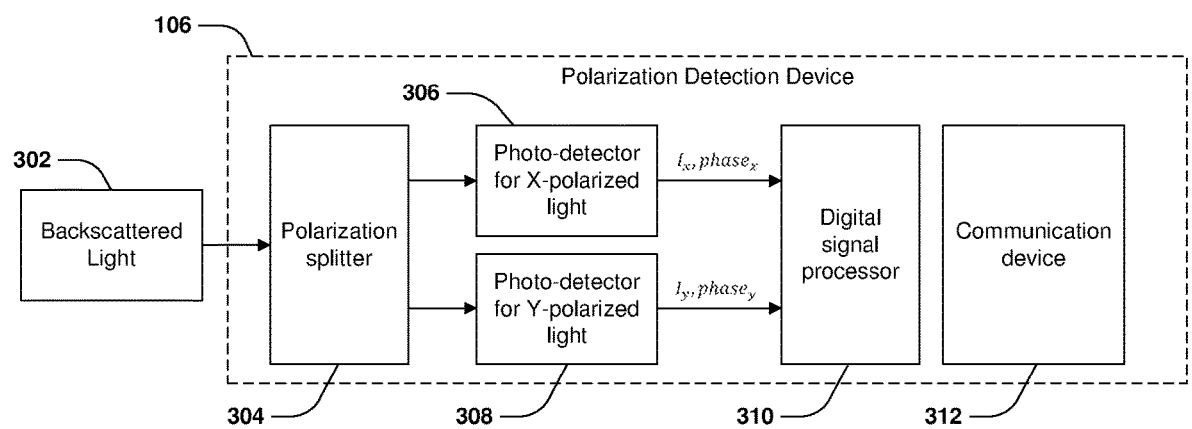
FIG. 3 is an illustration of a schematic view of a polarization detection device, according to some embodiments.

FIG. 3 illustrates the polarization detection device 106 according to some embodiments. The polarization detection device 106 may comprise a polarization splitter 304, a first photo-detector 306, a second photo-detector 308, a processor 310 (e.g., a digital signal processor) and/or the second communication device 312.

In some examples, the polarization splitter 304 may split backscattered light 302 (e.g., the first backscattered light, the second backscattered light, etc.) received from the first cable segment 112 into X-polarized light (e.g., horizontally polarized light) and Y-polarized light (e.g., vertically polarized light). The X-polarized light may be input to the first photo-detector 306 and the Y-polarized light may be input to the second photo-detector 308. In some examples, the first photo-detector 306 may sense the X-polarized light to determine one or more measurements of the X-polarized light, and/or generates a first signal (e.g., a digital signal) indicative of the one or more measurements of the X-polarized light. The second photo-detector 308 senses the Y-polarized light to determine one or more measurements of the Y-polarized light, and/or generates a second signal (e.g., a digital signal) indicative of the one or more measurements of the Y-polarized light. The first signal and/or the second signal may be input to the processor 310. The processor 310 may determine a measure of polarization (e.g., the first measure of polarization, the second measure of polarization, a measure of polarization of the plurality of measures of polarization, etc.) based upon the first signal and/or the second signal. The processor 310 may determine whether the second cable segment 114 is connected to the first cable segment 112 based upon the plurality of measures of polarization.

In an example, the one or more measurements of the X-polarized light output by the first photo-detector 306 may comprise a first intensity, $I_x$, of the X-polarized light and/or a first phase, $phase_x$, of the X-polarized light. The one or more measurements of the Y-polarized light output by the second photo-detector 308 may comprise a second intensity, $I_y$, of the y-polarized light and/or a second phase, $phase_y$, of the Y-polarized light. The processor 310 may determine a state of polarization of the backscattered light 302 based upon $I_x$, $phase_x$, $I_y$ and/or $phase_y$. In some examples, the state of polarization may be represented by a set of parameters (e.g., Stokes parameters) $S_0$, $S_1$, $S_2$ and/or $S_4$, where (i) $S_0 = E_x^2 + E_y^2$, (ii) $S_1 = E_x^2 - E_y^2$, (iii) $S_2 = 2E_x E_y \cos \delta$, and/or (iv) $S_3 = 2E_x E_y \sin \delta$. $E_x$ may correspond to an electromagnetic field strength of the X-polarized light output by the polarization splitter 304, and/or may be determined based upon $I_x$ (e.g., $I_x = E_x^2$). $E_y$ may correspond to an electromagnetic field strength of the y-polarized light output by the polarization splitter 304, and/or may be determined based upon $I_y$ (e.g., $I_y = E_y^2$). In some examples, δ may correspond to a rotation angle of the backscattered light 302, and/or may be determined based upon $phase_x$ and/or $phase_y$ (e.g., $\delta = phase_x - phase_y$). In some examples, $I_x$ and/or $I_y$ may be normalized such that $I_x + I_y = 1$. In an example, $I_x = 0.64$, $I_y = 0.36$, and/or δ=30 degrees. Accordingly, $E_x = \sqrt{0.64} = 0.8$, $E_y = \sqrt{0.36} = 0.6$, $S_0 = 0.64 + 0.36 = 1$, $S_1 = 0.64 - 0.36 = 0.28$, $S_2 = 2(0.8)(0.6) \cos(30 \text{ degrees}) = 0.83$, and/or $S_3 = 2(0.8)(0.6) \sin(30 \text{ degrees}) = 0.48$, and the state of polarization may thus comprise [1, 0.28, 0.83, 0.48].

In some examples, in response to the processor 310 determining whether the second cable segment 114 is connected to the first cable segment 112, the second communication device 312 may transmit a message to the first communication device 212 (shown in FIG. 2A). When the second cable segment 114 is determined to be connected to the first cable segment 112, the message may indicate that the second cable segment 114 is connected to the first cable segment 112. When the second cable segment 114 is determined to not be connected to the first cable segment 112, the message may indicate that the second cable segment 114 is not connected to the first cable segment 112.

In some examples, the first communication device 212 of the polarization disturbance device 108 may receive the message. In response to receiving the message from the second communication device 312, the output device 210 of the polarization disturbance device 108 may output an indication of whether the second cable segment 114 is connected to the first cable segment 112. The output device 210 may comprise at least one of a speaker, a light source such as a light-emitting diode (LED), a graphical display, etc. In an example in which the output device 210 comprises an LED, the LED may display a first color (e.g., red) to indicate that the second cable segment 114 is not connected to the first cable segment 112 or a second color (e.g., green) to indicate that the second cable segment 114 is connected to the first cable segment 112. In an example in which the output device 210 comprises a speaker, the speaker may output an audible message indicating whether the second cable segment 114 is connected to the first cable segment 112. In an example in which the output device 210 comprises a graphical display, the graphical display may display a graphical message indicating whether the second cable segment 114 is connected to the first cable segment 112.

In some examples, the laser pulse generator 102, the polarization detection device 106 and/or the optical circulator 104 may be implemented in a package (e.g., a single package, such as a box). The first cable segment 112 may be connected to a port of the package, such as a port connected to the optical circulator 104. In some examples, the package may comprise an optoelectronic instrument, such as an optical time-domain reflectometer (OTDR) (e.g., the OTDR may comprise the laser pulse generator 102, the polarization detection device 106 and/or the optical circulator 104).

In some examples in which the first cable segment 112 is connected to the second cable segment 114, the first cable segment 112 and the second cable segment 114 may be both be sections of the same cable. In some examples in which the first cable segment 112 is connected to the second cable segment 114, the first cable segment 112 may be at least part of a first cable and the second cable segment 114 may be at least part of a second cable, wherein the second cable is different than the first cable and/or the second cable is connected to the first cable.

Figure 4:
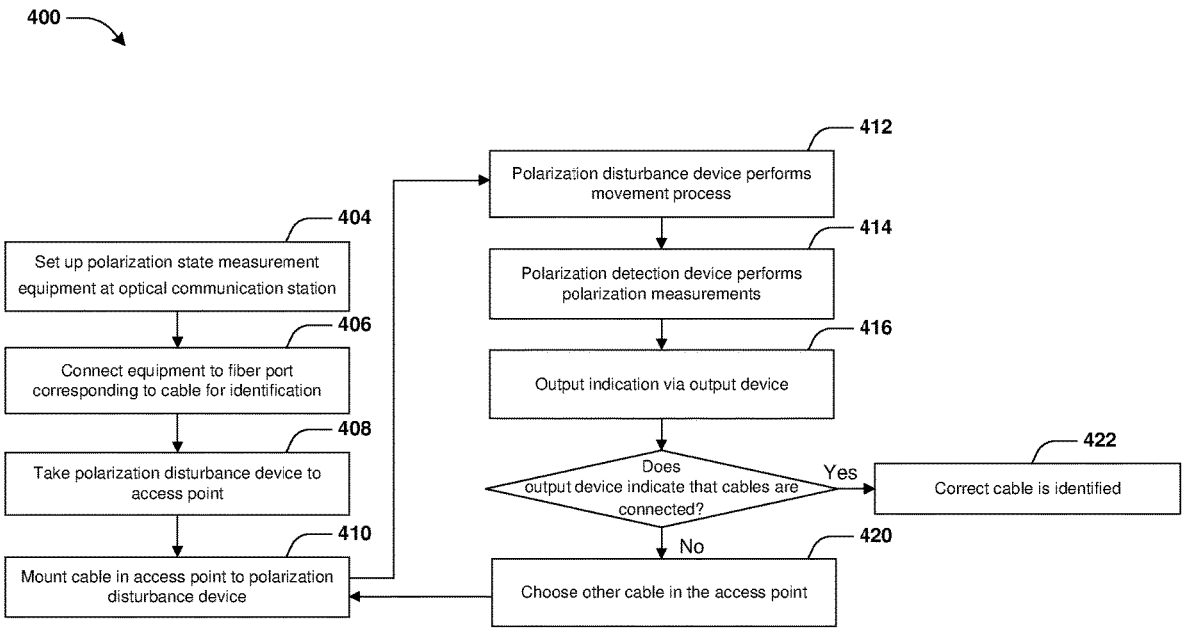
FIG. 4 is an illustration of a method of identifying cables, according to some embodiments.

An embodiment of identifying cables (e.g., cables in a field, such as the optical network) using the cable identification system 100 is illustrated by an exemplary method 400 of FIG. 4. At 404, polarization state measurement equipment (e.g., the laser pulse generator 102, the polarization detection device 106 and/or the optical circulator 104) may be set up (by a technician, a robot, etc., for example) in the optical communication station (e.g., at least one of the CO, the HE, the MSC, etc.). At 406, the polarization state measurement equipment may be connected (by the technician, the robot, etc., for example) to a fiber port of the first cable segment 112 (in the optical communication station, for example).

At 408, the polarization disturbance device may be taken (by the technician, the robot, etc., for example) to the access point 110. At 410, the second cable segment 114 may be mounted (by the technician, the robot, etc., for example) to the polarization disturbance device 108, such as by winding the second cable segment 114 around the cable support assembly one or more times. At 412, the polarization disturbance device 108 may perform a movement process to move the plate 204 and/or the second cable segment 114 (based upon a movement profile, for example). In some examples, the polarization disturbance device 108 may be activated and/or may perform the movement process in response to receiving an input via an input device (not shown) of the polarization disturbance device 108. In an example, the input device may comprise a button (e.g., a push button) and/or the input may comprise a selection of the button (e.g., the button being pushed by the technician, the robot, etc., for example). Alternatively and/or additionally, the polarization disturbance device 108 may transmit a message (e.g., the timing information message 226) to the polarization detection device 106 in response to the input. Based upon the message, the polarization detection device 106 may determine times for performing polarization measurements of backscattered light from the first cable segment 112. Alternatively and/or additionally, the polarization detection device 106 may control a start time of the movement process (e.g., the polarization detection device 106 may transmit an instruction to start the movement process at the start time), and may determine the times for performing the polarization measurements based upon the start time.

At 414, the polarization detection device 106 may perform polarization measurements (at the determined times, for example). The polarization measurements may be performed before, during and/or after the movement process. At 416, the polarization detection device 106 may determine whether the second cable segment 114 is connected to the first cable segment 112 based upon the polarization measurements. The polarization detection device 106 may transmit an indication of whether the second cable segment 114 is connected to the first cable segment 112 to the polarization disturbance device 108. Based upon the indication, the output device 210 may output an indication of whether the second cable segment 114 is connected to the first cable segment 112. If the output device 210 indicates that the second cable segment 114 is connected to the first cable segment 112, at 422, it may be determined (by the technician, the robot, etc., for example) that the correct cable is identified. If the output device 210 indicates that the second cable segment 114 is not connected to the first cable segment 112, at 420, a different cable segment in the access point 110 may be chosen (by the technician, the robot, etc., for example), and acts 410, 412, 414 and/or 416 may be repeated using the different cable segment (in place of the second cable segment 114, for example).

According to some embodiments, a cable identification system is provided. The cable identification system includes a laser pulse generator connected to a first optical-fiber cable segment and configured to emit laser pulses into the first optical-fiber cable segment; a polarization disturbance device configured to induce a change in polarization of a second optical-fiber cable segment via changing a position of the second optical-fiber cable segment; and a polarization detection device connected to the first optical-fiber cable segment and configured to (i) determine a first measure of polarization based upon first backscattered light received from the first optical-fiber cable segment when the second optical-fiber cable segment has a first position, wherein the first backscattered light results from a first laser pulse emitted into the first optical-fiber cable segment by the laser pulse generator, (ii) determine a second measure of polarization based upon second backscattered light received from the first optical-fiber cable segment when the second optical-fiber cable segment has a second position different than the first position, wherein the second backscattered light results from a second laser pulse emitted into the first optical-fiber cable segment by the laser pulse generator, and (iii) determine whether the first optical-fiber cable segment is connected to the second optical-fiber cable segment based upon the first measure of polarization and the second measure of polarization.

According to some embodiments, the polarization disturbance device includes a plate; a cable support assembly connected to the plate and configured to support the second optical-fiber cable segment proximate the plate; and a movement assembly configured to move the plate to change the position of the second optical-fiber cable segment from the first position to the second position.

According to some embodiments, the cable support assembly is configured to support the second optical-fiber cable segment in a coiled state in which the second optical-fiber cable segment is wound around an axis orthogonal to a plane within which a greatest extent of the plate lies.

According to some embodiments, the movement assembly includes a motor.

According to some embodiments, the movement assembly is configured to move the plate, using the motor, based upon a movement profile; the polarization detection device is configured to determine a first polarization change based upon the first measure of polarization and the second measure of polarization; and the determination of whether the first optical-fiber cable segment is connected to the second optical-fiber cable segment is based upon whether the first polarization change is within a defined range of polarization changes associated with the movement profile.

According to some embodiments, the polarization detection device includes a first communication device; the polarization disturbance device includes a second communication device; and the first communication device is configured to transmit, to the second communication device, a message indicative of whether the first optical-fiber cable segment is connected to the second optical-fiber cable segment.

According to some embodiments, the polarization disturbance device includes an output device including a speaker, a light source, and/or a graphical display; and the output device is configured to output, based upon the message, an indication of whether the first optical-fiber cable segment is connected to the second optical-fiber cable segment.

According to some embodiments, the first measure of polarization includes a first state of polarization of the first backscattered light from the first optical-fiber cable segment; and the second measure of polarization includes a second state of polarization of the second backscattered light from the first optical-fiber cable segment.

According to some embodiments, the polarization detection device includes a polarization splitter configured to split the first backscattered light, received from the first optical-fiber cable segment, into first X-polarized light and first Y-polarized light; a first photo-detector configured to sense the first X-polarized light received from the polarization splitter; a second photo-detector configured to sense the first Y-polarized light received from the polarization splitter; and a processor configured to determine the first measure of polarization based upon a first signal from the first photo-detector and a second signal from the second photo-detector.

According to some embodiments, a cable identification system is provided. The cable identification system includes a laser pulse generator connected to a first optical-fiber cable segment and configured to emit laser pulses into the first optical-fiber cable segment; and a polarization detection device connected to the first optical-fiber cable segment and configured to (i) determine a first measure of polarization based upon first backscattered light received from the first optical-fiber cable segment when a second optical-fiber cable segment has a first position, wherein the first backscattered light results from a first laser pulse emitted into the first optical-fiber cable segment by the laser pulse generator, (ii) determine a second measure of polarization based upon second backscattered light received from the first optical-fiber cable segment when the second optical-fiber cable segment has a second position different than the first position, wherein the second backscattered light results from a second laser pulse emitted into the first optical-fiber cable segment by the laser pulse generator, and (iii) determine whether the first optical-fiber cable segment is connected to the second optical-fiber cable segment based upon the first measure of polarization and the second measure of polarization.

According to some embodiments, the cable identification system includes a first communication device configured to receive, from a polarization disturbance device, timing information associated with movement of the second optical-fiber cable segment from the first position to the second position, wherein the first measure of polarization and the second measure of polarization are determined based upon the timing information.

According to some embodiments, the first communication device is a wireless communication device configured to wirelessly receive the timing information.

According to some embodiments, the polarization detection device is configured to determine a first polarization change based upon the first measure of polarization and the second measure of polarization; and the determination of whether the first optical-fiber cable segment is connected to the second optical-fiber cable segment is based upon whether the first polarization change is within a defined range of polarization changes associated with a movement profile based upon which the second optical-fiber cable segment is moved from the first position to the second position.

According to some embodiments, the polarization detection device includes a polarization splitter configured to split the first backscattered light, received from the first optical-fiber cable segment, into first X-polarized light and first Y-polarized light; a first photo-detector configured to sense the first X-polarized light received from the polarization splitter; a second photo-detector configured to sense the first Y-polarized light received from the polarization splitter; and a processor configured to determine the first measure of polarization based upon a first signal from the first photo-detector and a second signal from the second photo-detector.

According to some embodiments, the first measure of polarization includes a first state of polarization of the first backscattered light from the first optical-fiber cable segment; and the second measure of polarization includes a second state of polarization of the second backscattered light from the first optical-fiber cable segment.

According to some embodiments, the cable identification system includes an optical circulator connected to the laser pulse generator, the first optical-fiber cable segment, and the polarization detection device, wherein the optical circulator is configured to (i) conduct laser pulses from the laser pulse generator to the first optical-fiber cable segment, and (ii) conduct backscattered light from the first optical-fiber cable segment to the polarization detection device.

According to some embodiments, a polarization disturbance device is provided. The polarization disturbance device includes a plate; a cable support assembly connected to the plate and configured to support a first optical-fiber cable segment proximate the plate; and a movement assembly configured to move the plate to change a position of the first optical-fiber cable segment from a first position to a second position, wherein (i) the movement of the plate induces a change in polarization of backscattered light travelling from the first optical-fiber cable segment to a polarization detection device, (ii) a first communication device of the polarization disturbance device is configured to transmit timing information, associated with the movement of the plate, to the polarization detection device, and/or (iii) the first communication device is configured to receive, from the polarization detection device, a message indicative of whether the first optical-fiber cable segment is connected to a second optical-fiber cable segment that is connected to the polarization detection device.

According to some embodiments, the cable support assembly is configured to support the first optical-fiber cable segment in a coiled state.

According to some embodiments, the first optical-fiber cable segment in the coiled state includes one or more windings around an axis orthogonal to a plane within which a greatest extent of the plate lies.

According to some embodiments, the polarization disturbance device includes an output device including a speaker, a light source, and/or a graphical display, wherein the output device is configured to output, based upon the message, an indication of whether the first optical-fiber cable segment is connected to the second optical-fiber cable segment.

Figure 5:
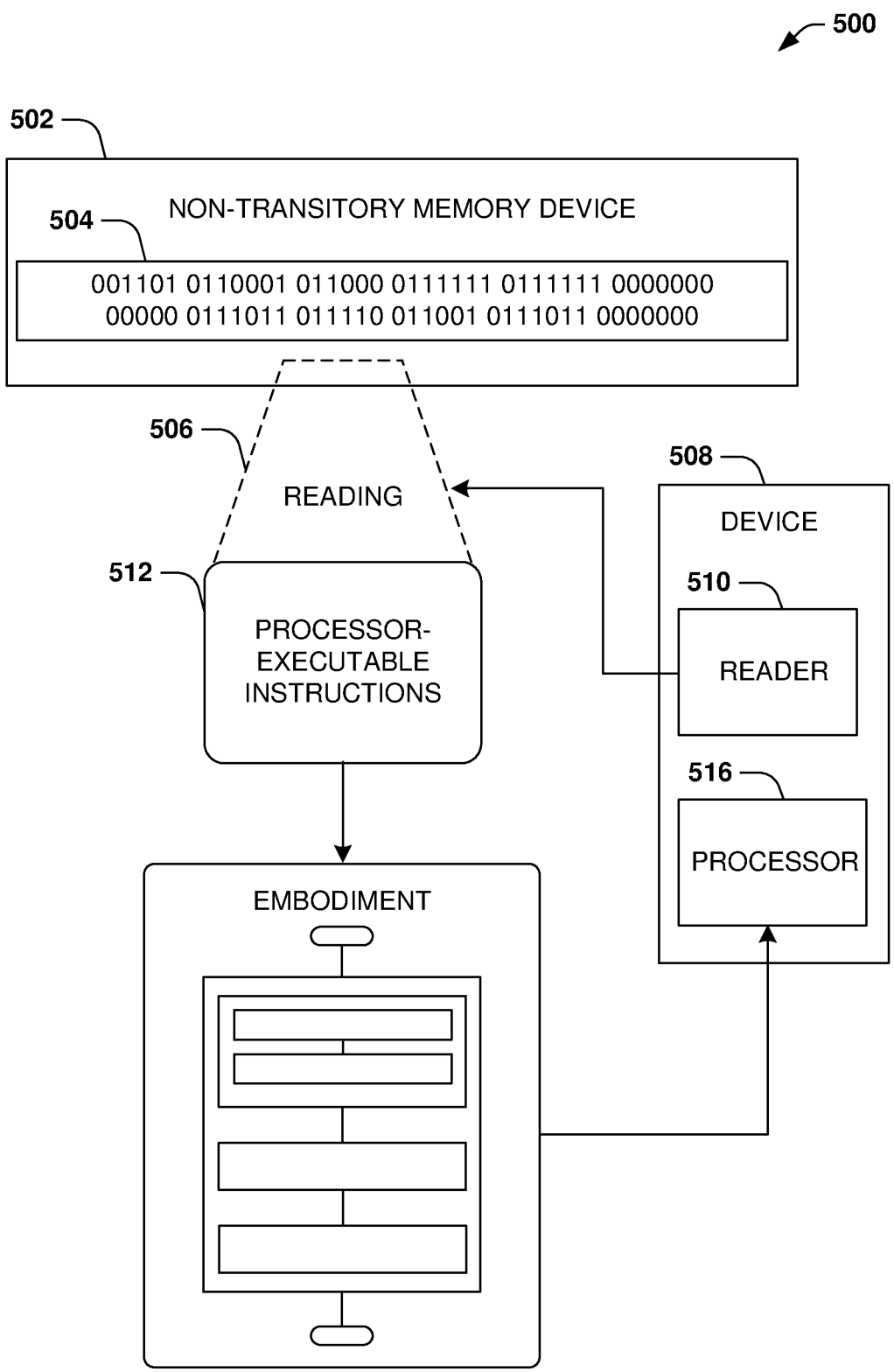
FIG. 5 is an illustration of a scenario featuring an example non-transitory machine readable medium and/or an example processor in accordance with one or more of the provisions set forth herein.

FIG. 5 is an illustration of a scenario 500 involving an example non-transitory machine readable medium 502 and/or an example processor 516. The non-transitory machine readable medium 502 may comprise processor-executable instructions 512 that when executed by the processor 516 (e.g., a central processing unit) cause performance (e.g., by the processor 516) of at least some of the provisions herein. The non-transitory machine readable medium 502 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 502 stores computer-readable data 504 that, when subjected to reading 506 by a reader 510 of a device 508 (e.g., a read head of a hard disk drive, or a read operation invoked on a solid-state storage device), express the processor-executable instructions 512. In some embodiments, the processor-executable instructions 512, when executed (e.g., by the processor 516) cause performance of operations, such as at least some of the exemplary method 400 of FIG. 4, for example. In some embodiments, one or more of the devices provided herein (e.g., one or more devices shown in and/or described with respect to FIGS. 1A-1B, 2A-2G, 3 and/or 4) may be controlled by the processor 516. In some embodiments, the processor 516 is configured to control the laser pulse generator 102, the polarization detection device 106, and/or the polarization disturbance device 108 (according to the techniques provided herein, for example).

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A cable identification system, comprising:
    a laser pulse generator connected to a first optical-fiber cable segment and configured to emit laser pulses into the first optical-fiber cable segment;
    a polarization disturbance device configured to induce a change in polarization of a second optical-fiber cable segment via changing a position of the second optical-fiber cable segment; and
    a polarization detection device connected to the first optical-fiber cable segment and configured to:
        determine a first measure of polarization based upon first backscattered light received from the first optical-fiber cable segment when the second optical-fiber cable segment has a first position, wherein the first backscattered light results from a first laser pulse emitted into the first optical-fiber cable segment by the laser pulse generator;
        determine a second measure of polarization based upon second backscattered light received from the first optical-fiber cable segment when the second optical-fiber cable segment has a second position different than the first position, wherein the second backscattered light results from a second laser pulse emitted into the first optical-fiber cable segment by the laser pulse generator; and
        determine whether the first optical-fiber cable segment is connected to the second optical-fiber cable segment based upon the first measure of polarization and the second measure of polarization.

2. The cable identification system of claim 1, wherein the polarization disturbance device comprises:
    a plate;
    a cable support assembly connected to the plate and configured to support the second optical-fiber cable segment proximate the plate; and
    a movement assembly configured to move the plate to change the position of the second optical-fiber cable segment from the first position to the second position.

3. The cable identification system of claim 2, wherein:
    the cable support assembly is configured to support the second optical-fiber cable segment in a coiled state in which the second optical-fiber cable segment is wound around an axis orthogonal to a plane within which a greatest extent of the plate lies.

4. The cable identification system of claim 2, wherein:
    the movement assembly comprises a motor.

5. The cable identification system of claim 4, wherein:
    the movement assembly is configured to move the plate, using the motor, based upon a movement profile;
    the polarization detection device is configured to determine a first polarization change based upon the first measure of polarization and the second measure of polarization; and
    the determination of whether the first optical-fiber cable segment is connected to the second optical-fiber cable segment is based upon whether the first polarization change is within a defined range of polarization changes associated with the movement profile.

6. The cable identification system of claim 1, wherein:
    the polarization detection device comprises a first communication device;
    the polarization disturbance device comprises a second communication device; and
    the first communication device is configured to transmit, to the second communication device, a message indicative of whether the first optical-fiber cable segment is connected to the second optical-fiber cable segment.

7. The cable identification system of claim 6, wherein:
    the polarization disturbance device comprises an output device comprising at least one of a speaker, a light source, or a graphical display; and
    the output device is configured to output, based upon the message, an indication of whether the first optical-fiber cable segment is connected to the second optical-fiber cable segment.

8. The cable identification system of claim 1, wherein:
    the first measure of polarization comprises a first state of polarization of the first backscattered light from the first optical-fiber cable segment; and the second measure of polarization comprises a second state of polarization of the second backscattered light from the first optical-fiber cable segment.

9. The cable identification system of claim 1, wherein the polarization detection device comprises:
a polarization splitter configured to split the first backscattered light, received from the first optical-fiber cable segment, into first X-polarized light and first Y-polarized light;
a first photo-detector configured to sense the first X-polarized light received from the polarization splitter;
a second photo-detector configured to sense the first Y-polarized light received from the polarization splitter; and
a processor configured to determine the first measure of polarization based upon a first signal from the first photo-detector and a second signal from the second photo-detector.

10. A cable identification system, comprising:
a laser pulse generator connected to a first optical-fiber cable segment and configured to emit laser pulses into the first optical-fiber cable segment; and
a polarization detection device connected to the first optical-fiber cable segment and configured to:
determine a first measure of polarization based upon first backscattered light received from the first optical-fiber cable segment when a second optical-fiber cable segment has a first position, wherein the first backscattered light results from a first laser pulse emitted into the first optical-fiber cable segment by the laser pulse generator;
determine a second measure of polarization based upon second backscattered light received from the first optical-fiber cable segment when the second optical-fiber cable segment has a second position different than the first position, wherein the second backscattered light results from a second laser pulse emitted into the first optical-fiber cable segment by the laser pulse generator; and
determine whether the first optical-fiber cable segment is connected to the second optical-fiber cable segment based upon the first measure of polarization and the second measure of polarization.

11. The cable identification system of claim 10, comprising:
a first communication device configured to receive, from a polarization disturbance device, timing information associated with movement of the second optical-fiber cable segment from the first position to the second position, wherein the first measure of polarization and the second measure of polarization are determined based upon the timing information.

12. The cable identification system of claim 11, wherein:
the first communication device is a wireless communication device configured to wirelessly receive the timing information.

13. The cable identification system of claim 10, wherein:
the polarization detection device is configured to determine a first polarization change based upon the first measure of polarization and the second measure of polarization; and
the determination of whether the first optical-fiber cable segment is connected to the second optical-fiber cable segment is based upon whether the first polarization change is within a defined range of polarization changes.

14. The cable identification system of claim 10, wherein the polarization detection device comprises:
a polarization splitter configured to split the first backscattered light, received from the first optical-fiber cable segment, into first X-polarized light and first Y-polarized light;
a first photo-detector configured to sense the first X-polarized light received from the polarization splitter;
a second photo-detector configured to sense the first Y-polarized light received from the polarization splitter; and
a processor configured to determine the first measure of polarization based upon a first signal from the first photo-detector and a second signal from the second photo-detector.

15. The cable identification system of claim 10, wherein:
the first measure of polarization comprises a first state of polarization of the first backscattered light from the first optical-fiber cable segment; and
the second measure of polarization comprises a second state of polarization of the second backscattered light from the first optical-fiber cable segment.

16. The cable identification system of claim 10, comprising:
an optical circulator connected to the laser pulse generator, the first optical-fiber cable segment, and the polarization detection device, wherein the optical circulator is configured to:
conduct laser pulses from the laser pulse generator to the first optical-fiber cable segment; and
conduct backscattered light from the first optical-fiber cable segment to the polarization detection device.

17. A polarization disturbance device, comprising:
a plate;
a cable support assembly connected to the plate and configured to support a first optical-fiber cable segment proximate the plate; and
a movement assembly configured to move the plate to change a position of the first optical-fiber cable segment from a first position to a second position, wherein at least one of:
the movement of the plate induces a change in polarization of backscattered light travelling from the first optical-fiber cable segment to a polarization detection device;
a first communication device of the polarization disturbance device is configured to transmit timing information, associated with the movement of the plate, to the polarization detection device; or
the first communication device is configured to receive, from the polarization detection device, a message indicative of whether the first optical-fiber cable segment is connected to a second optical-fiber cable segment that is connected to the polarization detection device.

18. The polarization disturbance device of claim 17, wherein:
the cable support assembly is configured to support the first optical-fiber cable segment in a coiled state.

19. The polarization disturbance device of claim 18, wherein:
the first optical-fiber cable segment in the coiled state comprises one or more windings around an axis orthogonal to a plane within which a greatest extent of the plate lies.

20. The polarization disturbance device of claim 17, comprising:

an output device comprising at least one of a speaker, a light source, or a graphical display, wherein the output device is configured to output, based upon the message, an indication of whether the first optical-fiber cable segment is connected to the second optical-fiber cable segment.

* * * * *